United States Patent [19]

Tabel et al.

[11] 4,139,163

[45] Feb. 13, 1979

[54] LOADING A CASSETTE WITH AN ENDLESS ROLL OF STRIP FORM MATERIAL

[75] Inventors: Walter Tabel, Cologne; Heinz Johanns, Leverkusen, both of Fed. Rep. of Germany

[73] Assignee: AGFA-Gevaert AG, Leverkusen, Fed. Rep. of Germany

[21] Appl. No.: 816,168

[22] Filed: Jul. 15, 1977

[30] Foreign Application Priority Data

Jul. 21, 1976 [DE] Fed. Rep. of Germany ....... 2632767

[51] Int. Cl.² .......................... B65H 19/20; B31F 5/00
[52] U.S. Cl. ................................. 242/56 R; 156/506; 242/58.1; 242/67.1 R
[58] Field of Search ................... 242/56 R, 58.1, 58.2, 242/58.3, 58.4, 56.8, 67.1 R, 55.19 R, 55.19 A; 156/505, 506

[56] References Cited

U.S. PATENT DOCUMENTS

| 3,753,835 | 8/1973 | King | 156/506 |
| 3,770,551 | 11/1973 | Ceroll | 242/56 R |
| 3,870,584 | 3/1975 | Jones | 156/505 |
| 3,888,480 | 6/1975 | Bagozzi | 242/58.4 |
| 3,997,123 | 12/1976 | King | 242/58.4 |

*Primary Examiner*—Edward J. McCarthy
*Attorney, Agent, or Firm*—Connolly and Hutz

[57] ABSTRACT

The invention relates to a method and device for loading a cassette with an endless roll of strip form material from sections of a finite feed spool.

4 Claims, 4 Drawing Figures

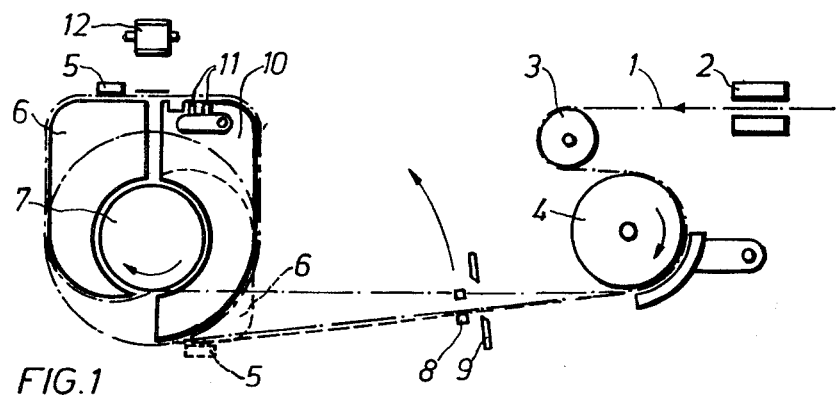
FIG. 1
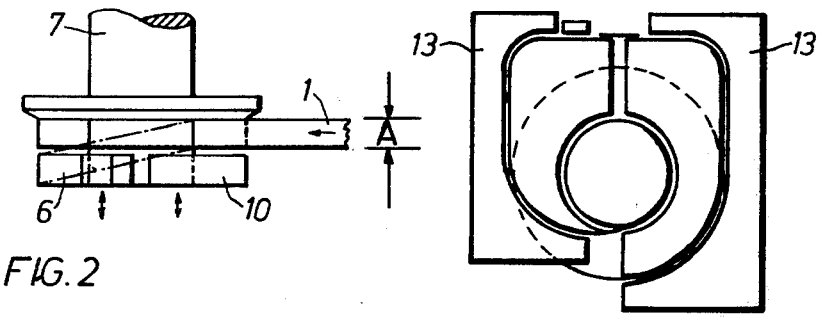
FIG. 2
FIG. 3
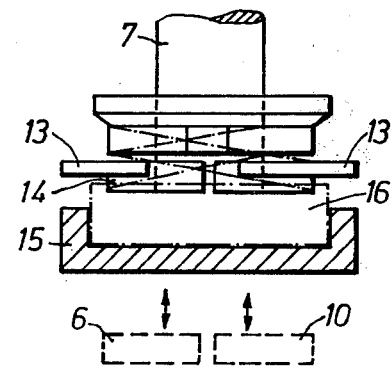
FIG. 4

LOADING A CASSETTE WITH AN ENDLESS ROLL OF STRIP FORM MATERIAL

The invention relates to a method of and a device for loading a cassette with an endless roll of strip-form material in particular a Super-8 roll of film.

A wide range of applications is offered for endless Super-8 rolls of film on account of their compact storage in a chamber and their ease of rewinding, so a considerable number of items are involved.

In the past, films of this type have been loaded by drawing both ends of the film of a roll of film manually into a second plane off-set by a film width and, after fixing in a device, splicing the ends by means of adhesive tape. The endless roll of film formed in this way is then inserted manually in a cassette whose side wall has previously been removed for this purpose.

Since the operation takes place in darkness, owing to the light sensitivity of the film, large numbers of cassettes cannot easily be loaded economically. Furthermore, there is a considerable danger from dirt in the operation, and thus a considerable risk of loss in quality on account of damage or jamming. In addition, disturbance-free control of the loading operation is almost impossible on account of the light sensitivity of the material.

An object of the invention is to provide a means of loading which is fail-safe in the dark, by means of which an endless roll of strip-form material with regular perforation may be produced from an endless strip, in particular a film strip, by splicing the ends of a section of the strip, this endless roll of film being automatically insertable in a cassette with a three-dimensionally fed film guide passage, thereby to give a loose, undamaged roll of film in a light-tight cassette.

According to the invention there is provided a method of loading a cassette with an endless roll of strip-form material comprising the steps of securing the beginning of a strip in a fastening element on the perimeter of a first half-form disc whose front face is connected to a winding shaft and whose outline reproduces a first section of a predetermined cassette guide passage, guiding the strip tangentially on to the winding shaft by means of the first half-form disc during a half rotation with simultaneous axial displacement by a distance equal to the width of the strip, building up a roll of material from the inside towards the outside of the winding shaft during further rotation of the shaft, ceasing to wind the material and severing the strip, guiding the severed end of the strip by means of a claw around a second half-form disc which reproduces the remainder of the said guide passage, splicing the severed end in the kink-free fashion to the beginning of the strip to form an endless roll, grasping the endless roll by means of a gripping device and removing the half-form discs, and feeding the roll of material into a winding chamber of a cassette which is open on one side, this winding chamber being provided with the strip guide passage.

The invention has the particular advantage that a section of a strip-form material may be wound into an endless roll in one uninterrupted winding process, in which only the ends of the strip have to be stuck. This therefore solves the problem of displacing the ends of the strip which, owing to the nature of the material, are springy, by a strip width and of bringing them over the half form discs in exactly the position which corresponds to the course of the strip guide passage of the cassettes. The roll of strip-form material may simultaneously be loosened by a corresponding difference between the rates of rotation of the sprocket wheel and the winding shaft. The simple rotational and linear movements ensure a clean loading operation, so that operational disturbances and damage to the product may be extensively avoided. This is very advantageous, since the process takes place in darkness and disturbance-free control of the loaded product is hardly possible.

In a particular embodiment of the method, the roll of material is wound without gaps between the individual layers, these only occurring after entry into the winding chamber.

With a tight roll of material the regulation of the drive form winding shaft and sprocket wheel is simple. The introduction of the roll of material into the winding chamber is also simplified.

The invention also provides an apparatus for loading a cassette with an endless roll of strip-form material comprising a strip delivery device having a press, a guide roller, a sprocket wheel and a severing knife, a winding station having a winding shaft, and a film gripping device, and a cassette positioning device having a gripping device, a lid opener and a lid closer, wherein the winding station comprises a first half-form disc having a fastening element on its perimeter for securing the beginning of the strip, the front face of the disc being connected to the winding shaft and one part of its contour corresponding to the projection of a strip guide passage of a cassette which begins tangentially internally on the winding shaft, a displacing device, by means of which the first half form disc at the strip inlet is axially displacable by a distance equal to the width of the strip; a second half-form disc which is connected by its front face to the winding shaft and whose contour corresponds to the remaining part of the projection of the guide passage which ends tangentially on the outside of the roll of material, a claw for moving the end of the film which may be between a severing knife and a film guide of the second half-form disc with simultaneous lateral displacement by one strip width, an adhering device adapted to be guided over the junction between the beginning and the end of material, a gripping device which is movable on the endless roll of material from the outside, and a conveyor which is movable parallel to the winding shaft with an endless roll of material.

The device is simple to construct and to maintain. There is no problem in exchanging half form discs and gripping devices, so they may be re-set without difficulty on other winding forms and strips. The simple movements allow fail-safe eccentric discs to be installed for regulation.

In one embodiment the half form discs and the gripping device have openings on the perimeter which may be connected to a vacuum generator. By means of a vacuum it is possible to hold the strips firmly and carefully on the half form discs during the sticking process.

An embodiment of the invention is shown in the accompanying drawings, in which:

FIG. 1 shows a film delivery device and winding station;

FIG. 2 is a plan view of a winding station;

FIG. 3 shows a winding station with gripping device; and

FIG. 4 is a plan view of a winding station with a cassette positioning device.

In FIGS. 1 and 2 a film 1 is fed past a press 2 via a guide roller 3, and a sprocket 4 into a clasp 5 (broken line) on a first half form disc 6, which is displaced by a film width A during the first half rotation of a winding shaft 7 so that a roll of film 14 builds up from the inside towards the outside on a winding shaft 7 during further rotation. After the rotational movement ceases, a claw 8 takes over the end of the strip which has been cut by a severing knife 9 and lays it round a second half form disc 10 during simultaneous lateral displacement by a film width A, where it is fastened by a vacuum in the openings 11 and spliced without kinks to the beginning of the film by means of adhesive tape applied by an adhering device 12.

After bringing forward the gripping device 13, FIG. 3, and removing the half-form discs 6, 10 the endless roll of film 14 (FIG. 4) is fed by means of a plug (not shown) into an open cassette 16 held by a positioning device 15. After closing the cassette with a lid (not shown) the cassette passes the filling device.

What we claim is:

1. A method of loading a cassette with an endless roll of strip-form material comprising the steps of securing a first end of a strip of material in a fastening means on the perimeter of a first half-form disc the front face of said first disc being connected to a winding shaft and having surfaces gathering and guiding the strip tangentially on to the winding shaft by means of the surfaces of the first half-form disc during a half rotation with simultaneous axial displacement by a distance equal to the width of the strip, building up a roll of said strip material from the inside towards the outside of the winding shaft upon further rotation of the shaft, ceasing to wind the material and severing the strip to form a second end, guiding the severed second end of the strip by means of a claw around a second half-form disc which has surfaces forming a guide passage, splicing the severed second end free of kinks to the first end of the strip to form an endless roll, grasping the half-form discs by means of a gripping device and removing the half-form discs, and then feeding the roll of material into a winding chamber of a cassette which is open on one side, this winding chamber being provided with strip guiding surfaces.

2. A method according to claim 1, wherein the roll of material is wound without gaps between the individual layers, which only occur after entry into the winding chamber.

3. An apparatus for loading a cassette with an endless roll of strip-form material comprising a strip delivery device having a press, a guide roller, a sprocket wheel and a severing knife, a winding station having a winding shaft, and a film gripping device, and a cassette positioning device having a gripping device, wherein the winding station comprises a first half-form disc being engageable on its perimeter with the leader of the strip material, the front face of the disc being connected to the winding shaft and having surfaces so constructed and arranged as to guide the strip material and feed the strip material into a roll which surfaces begin tangentially internally on the winding shaft, means on the winding shaft whereby the first half form disc at the strip inlet is axially displacable by a distance equal to the width of the strip; a second half-form disc which is connected by its front face to the winding shaft and having surfaces constructed to guide the strip material and feed the strip into a roll, one end of said surfaces being tangentially on the outside of the roll of material, a knife for severing the strip material positioned adjacent to but spaced from said surface end, a claw adapted to grasp a severed end of the strip material being positioned between the knife and the surface end adapted to move the severed end axially by one strip width, means for adhesively joining ends of the strip material adapted to be guided over the junction between the beginning and the end of material, means engageable on the exterior of the said half-form discs, and a roll engageable means being movable parallel to the winding shaft with the endless roll of material whereby the endless roll is fed to said cassette.

4. Apparatus as claimed in claim 3 wherein means on said discs contain openings through which suction may be applied to portions of said strip material.

* * * * *